United States Patent

[11] 3,582,712

[72] Inventor Darrell J. Blair
     Solvang, Calif.
[21] Appl. No. 32,075
[22] Filed Apr. 27, 1970
[45] Patented June 1, 1971
[73] Assignee MSB Electric Co. Inc.

[54] MOTOR HEATING UNIT WITH POWER FAILURE CONTROL RESPONSIVE TO AN UNHEATED CONDITION OF THE MOTOR
5 Claims, 2 Drawing Figs.

[52] U.S. Cl............................................. 317/13R,
     219/209, 317/13A, 318/436, 318/473, 318/483
[51] Int. Cl............................................. H02h 7/08
[50] Field of Search........................................ 318/436,
     471, 473, 483, 558; 317/13 R, 13 A, 13 B, ;
     307/118; 219/209

[56] References Cited
UNITED STATES PATENTS
| | | | | |
|---|---|---|---|---|
| 2,240,207 | 4/1941 | Crawford | | 318/558 |
| 2,338,518 | 1/1944 | Koch | | 318/558 |
| 2,991,346 | 7/1961 | Bahus, Jr. | | 318/471X |
| 3,195,044 | 7/1965 | Flanagan | | 219/209X |

Primary Examiner—Benjamin Dobeck
Assistant Examiner—H. Huberfeld
Attorney—Pastoriza and Kelly ABSTRACT: A motor heating unit is provided with power failure control for maintaining an electric motor in a warm condition after the motor has been turned off and preventing reapplication of power after a power failure until the motor is heated. An auxiliary source of electrical energy derived from the main input power source is automatically connected to the motor windings in response to turning off of the motor to thereby heat the motor and prevent the accumulation of moisture and the like. When the motor is turned on, the auxiliary heating means is disconnected. In the event of a power failure and a subsequent reapplication of power, the reapplication of power is prevented by a sensor means responsive to the condition of the motor until such time as the auxiliary electrical heating means for the motor has had time to heat the motor.

PATENTED JUN 1 1971

3,582,712

INVENTOR.
DARRELL J. BLAIR
BY Pastoriza & Kelly,
ATTORNEYS

MOTOR HEATING UNIT WITH POWER FAILURE CONTROL RESPONSIVE TO AN UNHEATED CONDITION OF THE MOTOR

BACKGROUND OF THE INVENTION

In high humidity climates such as coastal areas, the use of industrial electric motors for driving oil pumps, irrigation pumps, and the like has presented certain problems. Generally these motors range from 10 to 30 horse power and may be operated for long periods of time and then turned off for given periods in accordance with the particular operations being carried out.

When these industrial-type motors are turned off, moisture from the surrounding atmosphere tends to condense within the motor upon cooling of the motor. This moisture can be very harmful to the motor windings and many efforts have been made heretofore to eliminate such condensation. For example, space heaters or other type radiant heaters have been employed to maintain the temperature of the motor of the order of 15° to 20° C. above the normal ambient temperature so that condensation will not take place after the motor has been turned off. However, interior portions of the motor are not always maintained at such an elevated temperature so that condensation nevertheless will take place.

A somewhat improved concept with regard to heating the motors involves the provision of a small current, considerably less than the rated amperage of the motor, fed into the electrical input leads of the motor after the motor has been turned off. This small current will keep the interior of the motor at an elevated temperature and thus avoid the problem of condensation. However, such units as have been provided heretofore for carrying out this latter means of heating the motor have been somewhat complicated. First, the heating unit must be connected across the input electrical leads of the motor and it is possible that the heating unit itself may be damaged if the normal input power to the motor should be applied to these leads inadvertently. In addition, it is necessary that the motor come to rest before the application of any heating current to the interior of the motor from the unit as otherwise there can be generated a back voltage when the motor is still in motion which could damage the unit. These complications have in the past resulted in relatively expensive control equipment.

Many of the foregoing problems have been overcome by provision of a time delay in combination with an auxiliary electrical source utilized for heating the windings of the motor. This time delay will prevent the actual application of the auxiliary electrical source to the windings until the motor has had an opportunity to come to a complete rest after being turned off. My U.S. Pat. No. 3,445,743 issued May 20, 1969 and entitled Electric Motor Heating Unit describes one such system. In this patent, as well as in other systems for providing a small current to the motor windings to maintain it in a heated condition, the auxiliary source of electrical energy for heating purposes is normally derived from the main power source such as by means of a step down transformer. In the event of a power failure, not only is the motor turned off or shut down but also the auxiliary source of electrical energy for heating is lost. As a consequence, the motor can become cold with moisture forming on the windings. This cold condition of the motor lowers the resistance of the windings considerable so that a sudden reapplication of full power to the motor upon correction of the power failure could seriously damage the motor because of the large current drawn resulting from the lowered resistance of the windings.

BRIEF DESCRIPTION OF THE PRESENT INVENTION

With the foregoing in mind, the present invention contemplates an improved system over that shown in my heretofore referred to prior U.S. Pat. No. 3,445,743 wherein a sensor means is provided which functions to prevent the sudden reapplication of power to the motor after correction of a power failure until such time as the motor can be properly heated by the auxiliary electrical heating means. As a result, serious damage to the motor and possible overloading of the circuits is avoided since it is not possible to start the motor in a cold condition.

Briefly, the sensor means is provided in combination with a motor heating unit similar to that described in my above referred to patent. This means includes a normally closed sensor switch in series with the stop or off switch control for the main power switches connected between the power source and motor. The sensor switch is responsive to the resistance of the windings of the motor such that it will open if this resistance falls below a predetermined value as would obtain under cold motor conditions. Reapplication of power is thus not possible with the sensor switch open. However, application of the auxiliary electrical heating source to the windings will take place upon reapplication of the power and this heating of the windings will raise their resistance to a value above the predetermined resistance such that the sensor switch will automatically close when the motor is in properly heated condition so that the main switch control is in condition for manual starting by closing the start switch.

The foregoing arrangement thus prevents any inadvertant manual starting of the motor prior to its being properly heated in the event of a power failure and subsequent correction of the failure.

BRIEF DESCRIPTION OF THE DRAWINGS

A better understanding of the invention will be had by now referring to a preferred embodiment as illustrated in the accompanying drawings, in which.

DETAILED DESCRIPTION OF THE PREFERRED EMBODIMENT

Figure 1:
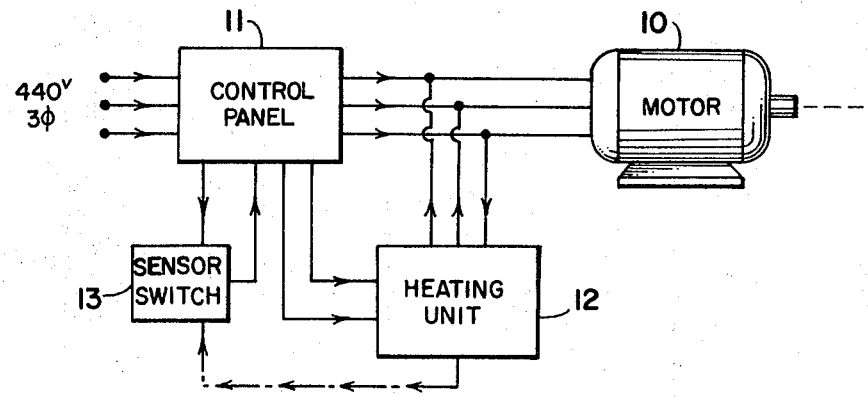
FIG. 1 is a schematic illustration partly in block form showing the basic heating unit of the motor in combination with the sensor means and control panel; and, FIG. 2 is a detailed circuit diagram of various components in the heating unit, control panel, and control for the sensor switch.

Referring first to FIG. 1 there is illustrated a motor 10 which would normally constitute an industrial type motor used in oil pumping operations in coastal areas or for driving irrigation pumps and the like. The motor 10 may range from 10 to 30 horse power and be of the induction type powered from a main 440 volt three phase power source. Control of the motor is effected by a magnetic starter structure in a control panel 11 receiving the main power source line as indicated.

A heating unit 12 providing an auxiliary source of electrical energy to heat the windings of the motor when the motor is shut down derives its energy from the main power source as indicated by leads from the control panel. In accord with the improved feature of the present invention there is also provided a sensor means including a sensor switch 13 which controls the main power switch in the control panel to prevent reapplication of power to the motor from the power source in the event of a power source failure and subsequent correction of such failure until such time as the motor can be properly heated by the heating unit 12.

Figure 2:
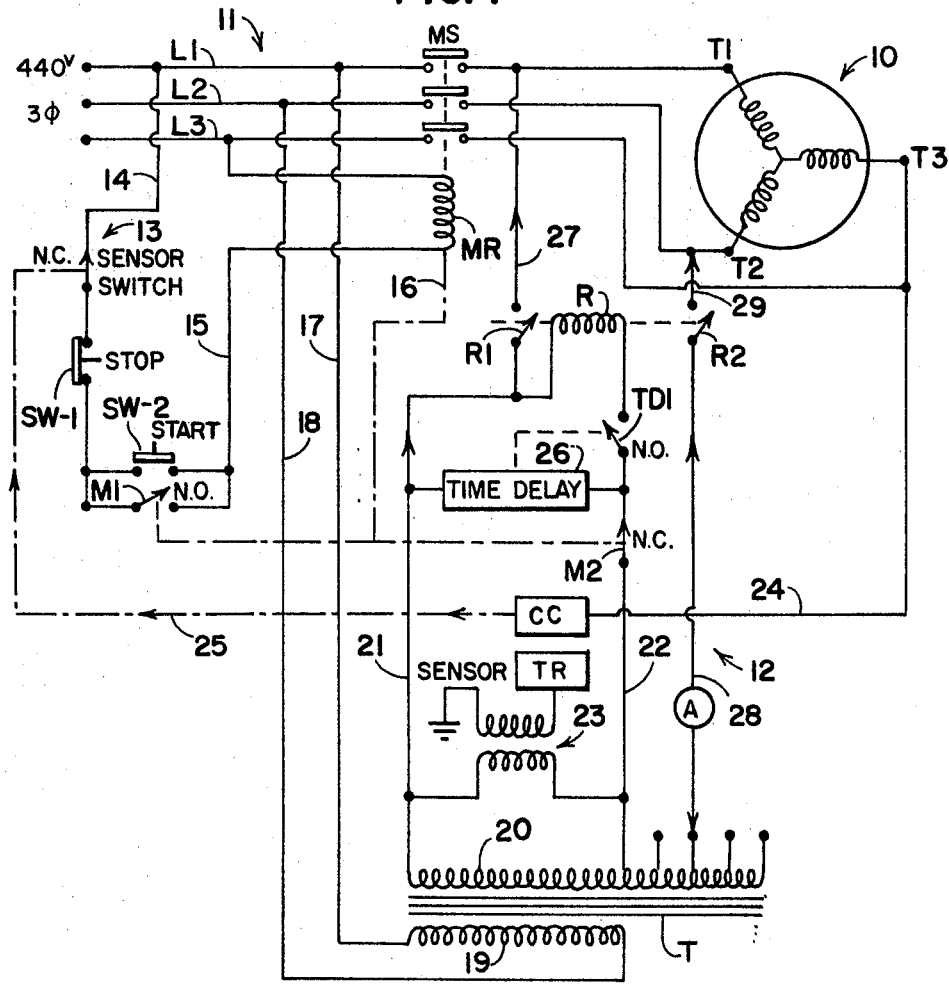

The manner in which the foregoing is accomplished will be evident by now referring to the detail circuit diagram of FIG. 2. As shown, the three phase windings for the motor 10 are indicated schematically and are provided with input terminals T1, T2, and T3. The main power source is brought in on three lines L1, L2, and L3 passing through a main power switch or master switch MS for connection to the terminals of the motor when the master switch is closed. Operation of the master switch is controlled by a start circuit including a lead 14 connecting to the power line L1 and passing through the sensor switch 13 which is indicated in normally closed position, a series connected stop switch SW-1, and a start switch SW-2 back through a line 15 connecting through a master relay coil MR to the power line L3. The master relay MR when energized closes the master power switch MS and when deenergized this master power switch automatically opens.

As schematically indicated, the energization of the relay MR also functions to close a normally open switch M1 paralleled across the start switch SW-2 and a normally closed control switch M2 in the heating unit circuit. The operation of these latter two switches is indicated by the dash-dot line 16 extending from the relay MR.

Auxiliary electrical energy for the heating unit is derived through leads 17 and 18 connecting respectively to the power source lines L1 and L2. As shown, these leads energize the primary coil 19 of the transformer T. In the preferred embodiment the transformer T is a step down transformer such that the current supplied to the motor 10 falls within a range of one-half to one-sixth the current rating of the motor. A portion of the secondary 20 of transformer T connects to lines 21 and 22 from which suitable control voltages may be obtained for operating various components in the heating unit. One of these components takes the form of a sensor means for operating the sensor switch 13. This sensor means is designated generally by the numeral 23 and includes a small transformer having its primary connected between the lines 21 and 22 and its secondary connected between ground and a triac and associated control TR and CC respectively. A line 24 from the terminal T3 of the motor connects to the contact control CC which controls operation of the sensor switch 13 as indicated by the dash-dot line 25.

Also connected between the lines 21 and 22 is a time delay 26. It will be noted that the control switch M2 referred to earlier will prevent energy from reaching the time delay 26 unless it is in closed condition. The time delay 26 operates a time delay switch TD-1 to close the same after a predetermined period of time has passed. Closing of this time delay switch TD-1 connects a relay coil R across the lines 21 and 22. This relay coil, upon energization, will close heating switch means R1 and R2. Closure of the relay switch R1 connects the line 21 from the secondary of the transformer through a line 27 to the terminal T1 of the motor winding. Closing of the switch R2 connects a line 28 connected to a tap on the secondary of the transformer 20 directly to a line 29 connecting to another terminal T2 of the motor winding. There is thus applied a small voltage across the motor windings determined by the tap position of the line 28 on the secondary of the transformer 20 and this small voltage results in a small current through the windings which will maintain them in a heated condition. An ameter A may be connected in series in the line 28 to provide an indication of the current flow through the windings for heating purposes.

OPERATION

With particular reference to FIG. 2, the positions of the various switches as shown are those that would occur immediately after the top switch had been depressed to open the line 14 thereby deenergizing the master relay MR and permitting the master switch and associated switch M1 to open. This deenergization of the master relay MR also closes the switch M2 so that it has the normally closed position shown.

Upon the closure of the control switch M2 when the motor is turned off by operation of the stop switch, the time delay 26 will be energized and after a given length of time determined by the length of time necessary for the armature of the motor 10 to come to rest, the time delay switch TD1 will close. Closing of this switch thus energizes the relay R from the secondary of the transformer 20 to thereby close the heating switches R1 and R2 and apply a small heating current to the windings of the motor. This heating current will maintain the motor at an elevated temperature to prevent the accumulation of moisture and the like.

If it is now desired to start the motor, the start switch SW-2 is depressed thereby closing a circuit through the lines 14 and 15 to energize the master relay MR which will then close the master switch MS to connect power from the lines L1, L2, and L3 to the corresponding motor terminals T1, T2, and T3. Energization of this master relay MR will also close the switch M1 shunting the start button so as to maintain power in the lines 14 and 15 and maintain the master relay MR energized until such time as the stop switch is depressed. Also, the normally closed control switch M2 in the heating unit will be open so that the relay R will be deenergized and the heating unit switches R1 and R2 will open to remove the auxiliary heating current from the motor windings. The motor will thus operate in a normal fashion until such time as it is stopped by operation of the stop button. In this latter event, the heretofore described process of applying heating current is repeated.

Assume that the motor is in its running condition as described above and that a power failure occurs such that all power is removed from the lines L1, L2, and L3. In this event, the master relay MR is deenergized and the master switch MS will open. Also, power to the primary 19 of the heating transformer through the leads 17 and 18 will be removed so that even though the control switch M2 closes, the time delay will not operate since there is no power on the secondary of the transformer. As a consequence, the windings of the motor 10 will become cold and moisture can collect.

If the power failure is ultimately corrected so that power again appears on the lines L1, L2, and L3 the transformer T will be energized and the heating unit will start heating the windings in the motor 10. However, should an operator at the power station start the motor 10 by operation of the start button immediately after the main power is restored, the heating unit will not have had time to properly heat the motor and the sudden surge of current into the cooled motor windings can cause overloading and damage.

The foregoing catastrophe is prevented by the sensor means of this invention. Thus, still referring to FIG. 2, assuming the operator depresses the start switch SW-2 immediately after power is restored on the lines, energy will be supplied from the secondary of the transformer 20 to the primary of the transformer 23 in the sensor circuit. The current flow in the secondary of this transformer which is connected in series between the windings of the motor and ground as indicated by the line 24 will be determined by the resistance of the motor windings. If this resistance falls below a given resistance value; for example, 1 megohm, the current flow is sufficient in the secondary to operate the triac and control contact relays to open the sensor switch 13 by immediately deenergizing the master relay MR and opening the master power switch MS. Thus the power on the line is prevented from damaging the motor 10. The sensor switch 13 will be held open until such time as the motor windings are heated sufficiently by the heating unit to raise their resistance to a value such that current flow in the secondary of the isolating transformer 23 is reduced to the extent that the triac and contact control no longer can hold the sensor switch open. For example, when the resistance of the secondary windings reaches 2 megohm, the secondary current in the transformer 23 is reduced sufficiently that the normally closed sensor switch 13 will close. At this point, the operator can then start the motor by depressing of the start button SW-2. It will be clear that when the sensor switch 13 is open, depression of the start button SW-2 will have no effect since the line 14 is open.

The sensor means is thus, essentially, responsive to the temperature of the windings in the motor to prevent application of power following a power failure to the motor until such time as the temperature of the windings is increased sufficiently to assure that the motor is in properly heated condition to receive the power.

From the foregoing description, it will be evident that the present invention has thus provided an improved heating unit in that the power failure control has been incorporated to assure that application of power to the motor cannot be effected until such time as the windings are at a proper elevated temperature.

What I claim is:

1. A motor heating unit with power failure control for maintaining an electric motor in a warm condition after the motor has been turned off and preventing reapplication of power after a power failure until the motor is heated, comprising, in combination: a main power source connected to said motor; power switch means between said power source and motor for turning on and turning off said motor; an auxiliary source of electrical energy derived from said main power source; means for connecting said auxiliary source of electrical energy to the windings of said motor in response to opening of said power switch means and disconnecting said auxiliary source of electrical energy from said windings in response to closing of said power switch means; and sensor means connected to said power switch means and responsive to an unheated condition of said motor to open said power switch means and prevent reapplication of power to said motor in the event of a power failure and subsequent reapplication of power, until said motor is heated.

2. A motor unit with power failure control for maintaining an electric motor in a warm condition after the motor has been turned off and preventing reapplication of power after a power failure until the motor is heated, comprising, in combination: terminal means connected to the windings of said motor; a main power source connected to said terminal means; power switch means between said power source and terminal means for turning on and turning off said motor; an auxiliary source of electrical energy; heating switch means for connecting said auxiliary source of electrical energy to said terminal means when closed; time delay means responsive to turning off of said motor for closing said heating switch means after a given length of time at least as long as the time for said motor to come to rest after being turned off; and sensor means connected to said terminal means and said power switch means responsive to a decrease in the resistance of said windings in said motor below a given value to open said power switch means and prevent reapplication of power to said motor in the event of a power failure and subsequent reapplication of power, until said motor is heated sufficiently by said auxiliary source of electrical energy to raise said resistance above said given value.

3. A unit according to claim 2, in which said auxiliary source of electrical energy includes a transformer having its primary connected to said main power source and its secondary connected to said heating switch means.

4. A unit according to claim 3, in which said secondary of said transformer includes a plurality of tap points so that different voltages to be applied to said terminals through said heating switch means may be selected.

5. A unit according to claim 3, in which said transformer is a step down transformer such that current supplied to said motor falls within a range of from one-half to one-sixth the current rating of said motor.